US008332326B2

(12) United States Patent
Schrempp et al.

(10) Patent No.: US 8,332,326 B2
(45) Date of Patent: *Dec. 11, 2012

(54) METHOD AND APPARATUS TO IDENTIFY A WORK RECEIVED BY A PROCESSING SYSTEM

(75) Inventors: James B. Schrempp, Saratoga, CA (US); Alan Edel, San Jose, CA (US); Vanc Ikezoy, Los Gatos, CA (US)

(73) Assignee: Audible Magic Corporation, Los Gatos, CA (US)

( * ) Notice: Subject to any disclaimer, the term of this patent is extended or adjusted under 35 U.S.C. 154(b) by 1311 days.

This patent is subject to a terminal disclaimer.

(21) Appl. No.: 10/356,318

(22) Filed: Feb. 1, 2003

(65) Prior Publication Data
US 2004/0163106 A1 Aug. 19, 2004

(51) Int. Cl.
*G06F 21/00* (2006.01)
(52) U.S. Cl. .............. 705/51; 705/58; 726/26; 726/30; 726/32
(58) Field of Classification Search .................. None
See application file for complete search history.

(56) References Cited

U.S. PATENT DOCUMENTS

| | | | |
|---|---|---|---|
| 3,919,479 A | 11/1975 | Moon et al. .................. 179/1 SB |
| 4,230,990 A | 10/1980 | Lert, Jr. et al. ................ 455/67 |
| 4,449,249 A | 5/1984 | Price ................. 455/45 |
| 4,450,531 A | 5/1984 | Kenyon et al. ............... 364/604 |
| 4,454,594 A | 6/1984 | Hefron et al. |
| 4,677,455 A | 6/1987 | Okajima ................. 357/38 |
| 4,677,466 A | 6/1987 | Lert, Jr. et al. ................. 358/84 |
| 4,739,398 A | 4/1988 | Thomas et al. ................ 358/84 |
| 4,843,562 A | 6/1989 | Kenyon et al. ............... 364/487 |
| 4,918,730 A | 4/1990 | Schulze |
| 5,210,820 A | 5/1993 | Kenyon ............................ 395/2 |
| 5,247,688 A | 9/1993 | Ishigami |
| 5,283,819 A | 2/1994 | Glick et al. .................... 379/90 |
| 5,327,521 A | 7/1994 | Savic et al. |
| 5,437,050 A | 7/1995 | Lamb et al. ...................... 455/2 |
| 5,442,645 A | 8/1995 | Ugon et al. |
| 5,504,518 A | 4/1996 | Ellis et al. ......................... 348/2 |
| 5,581,658 A | 12/1996 | O'Hagan et al. ............... 395/22 |
| 5,588,119 A | 12/1996 | Vincent |
| 5,612,729 A | 3/1997 | Ellis et al. |

(Continued)

FOREIGN PATENT DOCUMENTS
EP 0349106 A1 1/1990
(Continued)

OTHER PUBLICATIONS

L. Baum et al., "A Maximization Technique Occurring in the Statistical Analysis of Probabilistic Functions of Markov Chains," *The Annals of Mathematical Statistics,*, vol. 41, No. 1 pp. 164-171, 1970 (no month).

(Continued)

*Primary Examiner* — Jamie Kucab
(74) *Attorney, Agent, or Firm* — Lowenstein Sandler PC

(57) ABSTRACT

A method and system for identifying a work in a data transfer. In accordance with this invention, a data transfer is received. The media content of a work is then read from the data transfer. The media content is then used to generate a fingerprint of the work. The fingerprint is then used to identify the work. A report including the identity of the work is then generated.

19 Claims, 6 Drawing Sheets

U.S. PATENT DOCUMENTS

Figure 1:
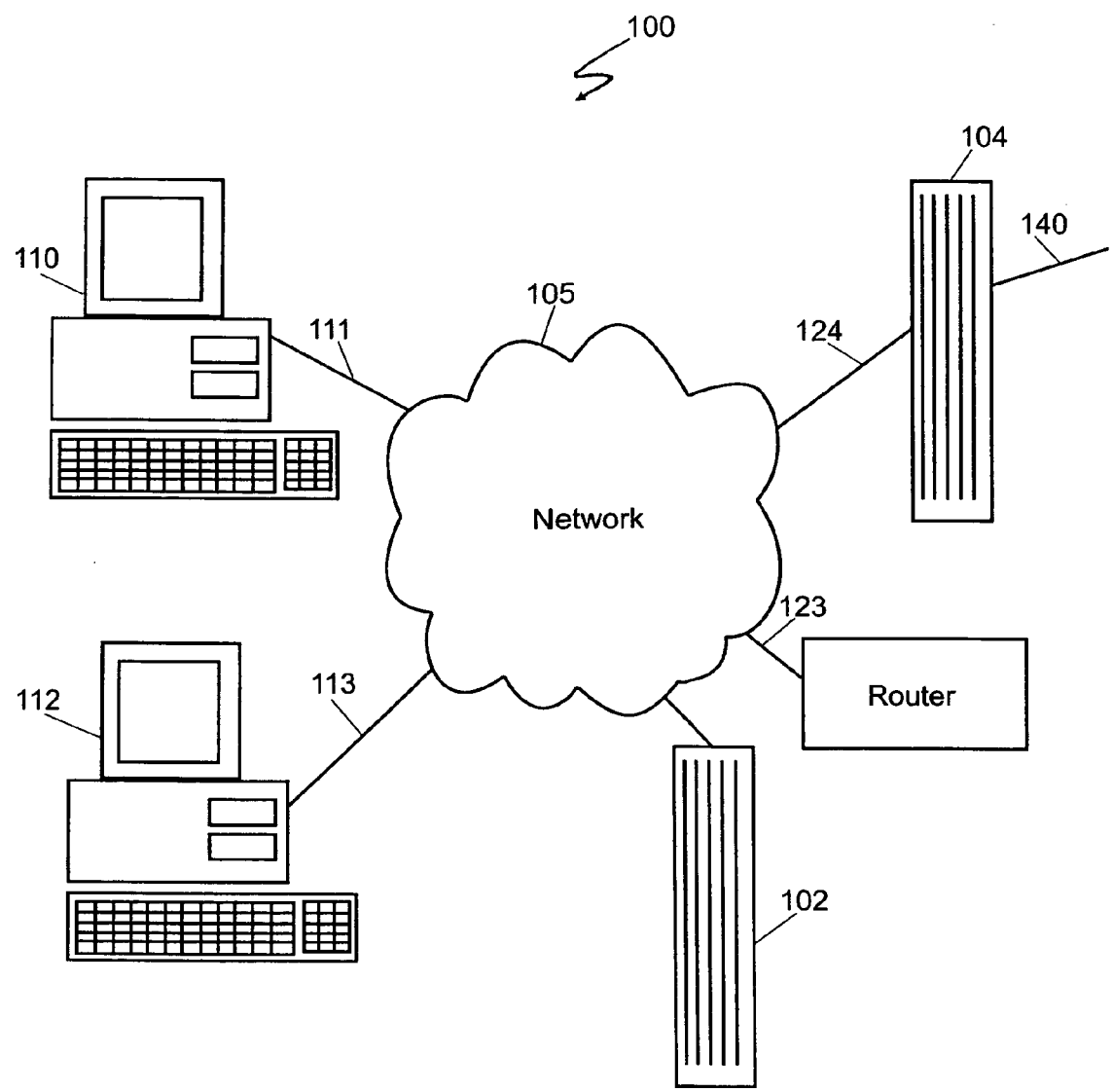

| | | | |
|---|---|---|---|
| 5,612,974 A | 3/1997 | Astrachan | |
| 5,613,004 A | 3/1997 | Cooperman et al. | 380/28 |
| 5,638,443 A | 6/1997 | Stefik | |
| 5,692,213 A | 11/1997 | Goldberg et al. | |
| 5,701,452 A | 12/1997 | Siefert | |
| 5,710,916 A | 1/1998 | Barbara et al. | 395/609 |
| 5,724,605 A | 3/1998 | Wissner | |
| 5,732,193 A | 3/1998 | Aberson | |
| 5,850,388 A | 12/1998 | Anderson et al. | |
| 5,881,182 A | 3/1999 | Fiete et al. | |
| 5,918,223 A * | 6/1999 | Blum et al. | 1/1 |
| 5,924,071 A | 7/1999 | Morgan et al. | |
| 5,930,369 A | 7/1999 | Cox et al. | 380/54 |
| 5,943,422 A * | 8/1999 | Van Wie et al. | 705/54 |
| 5,949,885 A | 9/1999 | Leighton | 380/54 |
| 5,959,659 A | 9/1999 | Dokic | |
| 5,983,176 A | 11/1999 | Hoffert et al. | 704/233 |
| 6,006,183 A | 12/1999 | Lai et al. | 704/235 |
| 6,006,256 A | 12/1999 | Zdepski et al. | 709/217 |
| 6,011,758 A | 1/2000 | Dockes et al. | 369/30 |
| 6,026,439 A | 2/2000 | Chowdhury et al. | 709/233 |
| 6,044,402 A | 3/2000 | Jacobson et al. | 709/225 |
| 6,067,369 A | 5/2000 | Kamei | |
| 6,088,455 A | 7/2000 | Logan et al. | |
| 6,092,040 A | 7/2000 | Voran | |
| 6,096,961 A | 8/2000 | Bruti et al. | 84/609 |
| 6,118,450 A | 9/2000 | Proehl et al. | 345/349 |
| 6,192,340 B1 | 2/2001 | Abecassis | 704/270 |
| 6,195,693 B1 | 2/2001 | Berry et al. | |
| 6,229,922 B1 | 5/2001 | Sasakawa et al. | |
| 6,243,615 B1 | 6/2001 | Neway et al. | 700/108 |
| 6,243,725 B1 | 6/2001 | Hempleman et al. | 707/530 |
| 6,253,193 B1 | 6/2001 | Ginter et al. | 705/57 |
| 6,253,337 B1 | 6/2001 | Maloney et al. | 714/38 |
| 6,279,010 B1 | 8/2001 | Anderson | 707/202 |
| 6,279,124 B1 | 8/2001 | Brouwer et al. | 714/38 |
| 6,285,596 B1 | 9/2001 | Miura et al. | |
| 6,330,593 B1 | 12/2001 | Roberts et al. | 709/217 |
| 6,345,256 B1 | 2/2002 | Milsted et al. | 705/1 |
| 6,374,260 B1 | 4/2002 | Hoffert et al. | 707/104.1 |
| 6,385,596 B1 | 5/2002 | Wiser et al. | 705/51 |
| 6,418,421 B1 | 7/2002 | Hurtado et al. | 705/54 |
| 6,422,061 B1 | 7/2002 | Sunshine et al. | 73/29.01 |
| 6,438,556 B1 | 8/2002 | Malik et al. | |
| 6,449,226 B1 | 9/2002 | Kumagai | 369/47.1 |
| 6,452,874 B1 | 9/2002 | Otsuka et al. | 369/14 |
| 6,453,252 B1 | 9/2002 | Laroche | 702/75 |
| 6,460,050 B1 | 10/2002 | Pace et al. | |
| 6,463,508 B1 | 10/2002 | Wolf et al. | |
| 6,477,704 B1 | 11/2002 | Cremia | 725/35 |
| 6,487,641 B1 | 11/2002 | Cusson et al. | |
| 6,490,279 B1 | 12/2002 | Chen et al. | |
| 6,496,802 B1 | 12/2002 | van Zoest et al. | 705/14 |
| 6,526,411 B1 | 2/2003 | Ward | |
| 6,542,869 B1 | 4/2003 | Foote | 704/500 |
| 6,550,001 B1 | 4/2003 | Corwin et al. | |
| 6,550,011 B1 | 4/2003 | Sims, III | 713/193 |
| 6,552,254 B2 | 4/2003 | Hasegawa et al. | |
| 6,591,245 B1 | 7/2003 | Klug | 705/10 |
| 6,609,093 B1 | 8/2003 | Gopinath et al. | |
| 6,609,105 B2 | 8/2003 | Van Zoest et al. | 705/14 |
| 6,628,737 B1 | 9/2003 | Timus | |
| 6,636,965 B1 | 10/2003 | Beyda et al. | |
| 6,654,757 B1 | 11/2003 | Stern | 707/101 |
| 6,732,180 B1 | 5/2004 | Hale et al. | 709/229 |
| 6,771,316 B1 | 8/2004 | Iggulden | |
| 6,771,885 B1 | 8/2004 | Agnihotri et al. | 386/83 |
| 6,834,308 B1 | 12/2004 | Ikezoye et al. | |
| 6,947,909 B1 | 9/2005 | Hoke, Jr. | |
| 6,968,337 B2 | 11/2005 | Wold | |
| 7,043,536 B1 | 5/2006 | Philyaw et al. | |
| 7,047,241 B1 | 5/2006 | Erickson et al. | |
| 7,058,223 B2 | 6/2006 | Cox et al. | |
| 7,181,398 B2 | 2/2007 | Thong et al. | |
| 7,266,645 B2 | 9/2007 | Garg et al. | |
| 7,269,556 B2 | 9/2007 | Kiss et al. | |
| 7,281,272 B1 | 10/2007 | Rubin et al. | |
| 7,289,643 B2 | 10/2007 | Brunk et al. | |
| 7,349,552 B2 | 3/2008 | Levy et al. | |
| 7,363,278 B2 * | 4/2008 | Schmelzer et al. | 705/67 |
| 7,426,750 B2 * | 9/2008 | Cooper et al. | 726/26 |
| 7,443,797 B2 | 10/2008 | Cheung et al. | |
| 7,500,007 B2 | 3/2009 | Ikezoye et al. | |
| 7,529,659 B2 | 5/2009 | Wold | |
| 7,546,120 B1 | 6/2009 | Ulvenes et al. | |
| 7,562,012 B1 | 7/2009 | Wold | |
| 7,565,327 B2 | 7/2009 | Schmelzer | |
| 7,593,576 B2 | 9/2009 | Meyer et al. | |
| 2001/0013061 A1 | 8/2001 | DeMartin et al. | 709/217 |
| 2001/0027493 A1 | 10/2001 | Wallace | |
| 2001/0027522 A1 | 10/2001 | Saito | |
| 2001/0034219 A1 | 10/2001 | Hewitt et al. | |
| 2001/0037304 A1 | 11/2001 | Paiz | 705/52 |
| 2001/0041989 A1 * | 11/2001 | Vilcauskas et al. | 705/1 |
| 2001/0051996 A1 * | 12/2001 | Cooper et al. | 709/217 |
| 2001/0056430 A1 | 12/2001 | Yankowski | |
| 2002/0049760 A1 * | 4/2002 | Scott et al. | 707/10 |
| 2002/0064149 A1 | 5/2002 | Elliott | |
| 2002/0069098 A1 * | 6/2002 | Schmidt | 705/7 |
| 2002/0082999 A1 | 6/2002 | Lee et al. | 705/51 |
| 2002/0087885 A1 | 7/2002 | Peled et al. | 713/201 |
| 2002/0120577 A1 | 8/2002 | Hans et al. | |
| 2002/0123990 A1 | 9/2002 | Abe et al. | |
| 2002/0129140 A1 | 9/2002 | Peled et al. | |
| 2002/0133494 A1 | 9/2002 | Goedken | |
| 2002/0141384 A1 | 10/2002 | Liu et al. | |
| 2002/0152261 A1 | 10/2002 | Arkin et al. | |
| 2002/0152262 A1 | 10/2002 | Arkin | |
| 2002/0156737 A1 | 10/2002 | Kahn et al. | |
| 2002/0158737 A1 | 10/2002 | Yokoyama | |
| 2002/0186887 A1 | 12/2002 | Rhoads | |
| 2002/0198789 A1 | 12/2002 | Waldman | 705/26 |
| 2003/0014530 A1 | 1/2003 | Bodin et al. | 709/231 |
| 2003/0018709 A1 | 1/2003 | Schrempp et al. | |
| 2003/0023852 A1 | 1/2003 | Wold | |
| 2003/0033321 A1 | 2/2003 | Schrempp et al. | |
| 2003/0037010 A1 | 2/2003 | Schmelzer | |
| 2003/0051100 A1 | 3/2003 | Patel | |
| 2003/0061352 A1 | 3/2003 | Bohrer et al. | 709/226 |
| 2003/0061490 A1 | 3/2003 | Abajian | |
| 2003/0095660 A1 | 5/2003 | Lee et al. | |
| 2003/0135623 A1 | 7/2003 | Schrempp et al. | |
| 2003/0191719 A1 | 10/2003 | Ginter et al. | |
| 2003/0195852 A1 | 10/2003 | Campbell et al. | |
| 2004/0008864 A1 * | 1/2004 | Watson et al. | 382/100 |
| 2004/0010495 A1 | 1/2004 | Kramer et al. | |
| 2004/0053654 A1 | 3/2004 | Kokumai et al. | |
| 2004/0073513 A1 | 4/2004 | Stefik et al. | |
| 2004/0089142 A1 * | 5/2004 | Georges et al. | 84/610 |
| 2004/0133797 A1 * | 7/2004 | Arnold | 713/200 |
| 2004/0148191 A1 | 7/2004 | Hoke, Jr. | |
| 2004/0167858 A1 | 8/2004 | Erickson | |
| 2004/0201784 A9 | 10/2004 | Dagtas et al. | |
| 2005/0021783 A1 | 1/2005 | Ishii | |
| 2005/0039000 A1 | 2/2005 | Erickson | |
| 2005/0044189 A1 | 2/2005 | Ikezoye et al. | |
| 2005/0097059 A1 | 5/2005 | Shuster | |
| 2005/0154678 A1 | 7/2005 | Schmelzer | |
| 2005/0154680 A1 | 7/2005 | Schmelzer | |
| 2005/0154681 A1 | 7/2005 | Schmelzer | |
| 2005/0216433 A1 | 9/2005 | Bland et al. | |
| 2005/0267945 A1 | 12/2005 | Cohen et al. | |
| 2005/0289065 A1 | 12/2005 | Weare | |
| 2006/0034177 A1 | 2/2006 | Schrempp | |
| 2006/0062426 A1 * | 3/2006 | Levy et al. | 382/100 |
| 2007/0074147 A1 | 3/2007 | Wold | |
| 2007/0078769 A1 | 4/2007 | Way et al. | |
| 2007/0186229 A1 | 8/2007 | Conklin et al. | |
| 2007/0226365 A1 | 9/2007 | Hildreth et al. | |
| 2008/0008173 A1 | 1/2008 | Kanevsky et al. | |
| 2008/0019371 A1 | 1/2008 | Anschutz et al. | |
| 2008/0133415 A1 | 6/2008 | Ginter et al. | |
| 2008/0141379 A1 | 6/2008 | Schmelzer | |
| 2008/0154730 A1 | 6/2008 | Schmelzer | |
| 2008/0155116 A1 | 6/2008 | Schmelzer | |
| 2009/0030651 A1 | 1/2009 | Wold | |
| 2009/0031326 A1 | 1/2009 | Wold | |

| | | | |
|---|---|---|---|
| 2009/0043870 | A1 | 2/2009 | Ikezoye et al. |
| 2009/0077673 | A1 | 3/2009 | Schmelzer |
| 2009/0089586 | A1 | 4/2009 | Brunk |
| 2009/0192640 | A1 | 7/2009 | Wold |
| 2009/0240361 | A1 | 9/2009 | Wold |
| 2009/0328236 | A1 | 12/2009 | Schmelzer |

FOREIGN PATENT DOCUMENTS

| | | |
|---|---|---|
| EP | 0 402 210 A1 | 6/1990 |
| EP | 0 459 046 A1 | 4/1991 |
| EP | 0 517 405 A2 | 5/1992 |
| EP | 0 731 446 A1 | 8/1995 |
| EP | 0689316 A2 | 12/1995 |
| EP | 0 859 503 A2 | 12/1998 |
| EP | 1 449 103 A1 | 8/2004 |
| EP | 1 485 815 A1 | 12/2004 |
| EP | 1 593 018 A2 | 11/2005 |
| EP | 1354276 B1 | 12/2007 |
| EP | 1485815 B1 | 10/2009 |
| WO | 96/36163 A2 | 11/1996 |
| WO | 98/20672 A2 | 5/1998 |
| WO | 00/05650 A1 | 2/2000 |
| WO | 00/39954 A1 | 7/2000 |
| WO | WO 00/63800 A1 | 10/2000 |
| WO | WO 01/23981 A1 | 4/2001 |
| WO | WO 01/47179 A1 | 6/2001 |
| WO | WO 01/52540 A1 | 7/2001 |
| WO | WO 01/62004 | 8/2001 |
| WO | WO 02/03203 | 1/2002 |
| WO | WO 02/15035 A2 | 2/2002 |
| WO | 02/37316 A3 | 5/2002 |
| WO | WO 02/37316 A2 | 5/2002 |
| WO | WO 02/082271 A1 | 10/2002 |
| WO | WO 03/007235 A1 | 1/2003 |
| WO | WO 03/009149 A1 | 1/2003 |
| WO | WO 03/036496 A1 | 5/2003 |
| WO | WO 03/067459 A1 | 5/2003 |
| WO | WO 02/037316 A3 | 8/2003 |
| WO | WO 03/091990 A1 | 11/2003 |
| WO | WO 2004/044820 A1 | 5/2004 |
| WO | WO 2004/070558 | 8/2004 |
| WO | WO 2006/015168 A2 | 2/2006 |
| WO | WO 2009/017710 | 2/2009 |

OTHER PUBLICATIONS

A. P. Dempster et al. "Maximum Likelihood from Incomplete Data via the $EM$ Algorithm", *Journal of the Royal Statistical Society, Series B (Methodological)*, vol. 39, Issue 1, pp. 1-38, 1977 (no month).

D. Reynolds et al., "Robust Text-Independent Speaker Identification Using Gaussian Mixture Speaker Models," *IEEE Transactions on Speech and Audio Processing*, vol. 3, No. 1, pp. 72-83, Jan. 1995.

B. Pellom et al., "Fast Likelihood Computation Techniques in Nearest-Neighbor Based Search for Continuous Speech Recognition," *IEEE Signal Processing Letters*, vol. 8. No. 8 pp. 221-224, Aug. 2001.

J. Haitsma et al., "Robust Audio Hashing for Content Identification," *CBMI 2001, Second International Workshop on Content Based Multimedia and Indexing*, Sep. 19-21, 2001, Brescia, Italy.

PacketHound Tech Specs, www.palisdesys.com/products/packethound/tech_specs/prod_Phtechspecs.shtml, 2002 (no month).

"How Does PacketHound Work?" www.palisadesys.com/products/packethound/how_does_it_work/prod_Phhow.shtml, 2002 (no month).

L. Baum et al., A Maximization Technique Occurring in the Statistical Analysis of Probabilistic Functions of Markov Chains, *The Annals of Mathematical Statistics*,, vol. 41, No. 1 pp. 164-171, 1970 (no month).

D. Reynolds et al., "Robust Text-Independent Speaker Identification Using Gaussian Mixture Speaker Models", *IEEE Transactions on Speech and Audio Processing*, vol. 3, No. 1, pp. 72-83, Jan. 1995.

B. Pellom et al., "Fast Likelihood Computation Techniques in Nearest-Neighbor Based search for Continuous Speech Recognition", *IEEE Signal Processing Letters*, vol. 8. No. * pp. 221-224, Aug. 2001.

J. Haitsma et al., "Robust Audio hashing for Content Identification", *CBMI 2001, Second International Workshop on Content Based Multimedia and Indexing*, Sep. 19-21, 2001, Brescia, Italy.

"How Does PacketHound Work?", www.palisadesys.com/products/packethound/how_does_it_work/prod_Phhow.shtml, 2002 (no month).

Ohtsuki K. et al., "Topic Extraction Based on Continuous Speech Recognition in Broadcast-news Speech," Automatic Speech Recognition and Understanding, Dec. 14, 1997, IEEE Workshop, IEEE, New York, NY; USA, pp. 527-534. Cited in European Supplemental Search Report for Corresponding PCT/US0222931, Category A, abstract. Relevant to Claim 9, 14, 40, 45. 40, 45.

Zawodny, Jeremy D., "A C Program to Compute CDDB discids on Linux and FreeBSD," [Online], Apr. 14, 2001, Retrieved from the Internet: URL:http://jeremy.zawodny.com/c/discid/discid-linux-1.3.tar.gz, [Retrieved on Jun. 6, 2006]. Cited in European Supplemental Search Report for Corresponding PCT/US0222931, Category A, the whole document. Relevant to Claim 9, 14, 40, 45. 40, 45.

Kanth, K. V. Ravi et al., "Dimensionality Reduction for Similarity Searching in Dynamic Databases," Computer Vision and Image Understanding, Jul./Aug. 1999, vol. 75, No. 1-2, Academic Press, San Diego, CA, US, pp. 59-72. Cited in European Supplemental Search Report for Corresponding PCT/US0222460, Category X, abstract. Relevant to Claim 1,2, 5-18.

Wold, E. et al., "Content-Based Classification, Search and Retrieval of Audio," 1996, vol. 3, No. 3, IEEE Multimedia, IEEE Service Center, New York, NY, US, pp. 27-36. Cited in European Supplemental Search Report for Corresponding PCT/US0222460, Category Y, abstract. Relevant to Claim 3,4,19, 20. Also the "Retrieving Sounds", Category A, section on p. 30, left-hand column-right hand column. Relevant to Claim 1,2, 5-18.

Wang, Yao et al., "Mulitmedia Content Analysis," IEEE Signal Processing Magazine, Nov. 2000, IEEE Service Center, New York, NY, USA, pp. 12-36. Cited in European Supplemental Search Report for Corresponding PCT/US0222460, Category A, p. 13, right-hand column-p. 17, right-hand column. Relevant to Claim 3,4,19, 20.

Beritelli, F., et al., "Multilayer Chaotic Encryption for Secure Communications in packet switching Networks," IEEE, vol. 2 Aug. 2000, pp. 1575-1582.

Blum, T., Keislar, D., Wheaton, J., and Wold, E., "Audio Databases with Content-Based Retrieval," Prodeedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recongnition solution, TRM, to signature its music catabblog for MusicBrainz database," http://www.relatable.com/news/pressrelease/001017.release.html, Oct. 17, 2000.

Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische lnformatik IV, L15, 16, D-68131 Mannheim.

Foote, J., "A Similarity Measure for Automatic Audio Classification," Institute of Systems Science, National University of Singapore, 1977, Singapore.

Keislar, D., Blum, T., Wheaton, J., and Wold, E., "Audio Analysis for Content-Based Retrieval" Proceedings of the 1995 International Computer Music Conference.

Reynolds, D., et al. , "Robust Text-Independent Speaker Identification Using Gaussian Mixture Speaker Models" *IEEE Transactions on Speech and Audio Procsessing*, vol. 3, No. 1, pp. 72-83 Jan. 1995.

Scheirer, E., Slaney, M., "Construction and Evaluation of a Robust Multifeature Speech/Music Discriminator," pp. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA.

Schneier, Bruce, Applied Cryptography, Protocols, Algorithms and Source Code in C, Chapter 2 Protocol Building Blocks, 1996, pp. 30-31.

Smith, Alan J., "Cache Memories," Computer Surveys, Sep. 1982, University of California, Berkeley, California, vol. 14, No. 3, pp. 1-61.

Vertegaal, R. and Bonis, E., "ISEE: An Intuitive Sound Editing Environment," Computer Music Journal, 18:2, pp. 21-22, Summer 1994.

European Patent Application No. 02752347.1, Supplementary European Search Report Dated May 8, 2006, 4 pages.

European Patent Application No. 02756525.8, Supplementary European Search Report Dated Jun. 28, 2006, 4 pages.

European Patent Application No. 02782170, Supplementary European Search Report Dated Feb. 7, 2007, 4 pages.

European Patent Application No. 02725522.3, Supplementary European Search Report Dated May 12, 2006, 2 Pages.

PCT Search Report PCT/US01/50295, International Search Report dated May 14, 2003, 5 Pages.

PCT Search Report PCT/US02/10615, International Search Report dated Aug. 7, 2002, 2 Pages.

PCT Search Report PCT/US02/33186, International Search Report dated Dec. 16, 2002, pp. 1-4.

PCT Search Report PCT/US04/02748, International Search Report and Written Opinion dated Aug. 20, 2007, 6 Pages.

PCT Search Report PCT/US05/26887, International Search Report dated May 3, 2006, 2 Pages.

PCT Search Report PCT/US08/09127, International Search Report dated Oct. 30, 2008, 8 Pages.

Audible Magic Office Action for U.S. Appl. No. 09/511,632 mailed Dec. 4, 2002.

Audible Magic Office Action for U.S. Appl. No. 09/511,632 mailed May 13, 2003.

Audible Magic Office Action for U.S. Appl. No. 09/511,632 mailed Aug. 27, 2003.

Audible Magic Office Action for U.S. Appl. No. 09/511,632 mailed Feb. 5, 2004.

Audible Magic Notice of Allowance for U.S. Appl. No. 09/511,632 mailed Aug. 10, 2004.

Audible Magic Notice of Allowance for U.S. Appl. No. 10/955,841 mailed Sep. 25, 2006.

Audible Magic Notice of Allowance for U.S. Appl. No. 10/955,841 mailed Mar. 23, 2007.

Audible Magic Notice of Allowance for U.S. Appl. No. 10/955,841 mailed Sep. 11, 2007.

Audible Magic Notice of Allowance for U.S. Appl. No. 10/955,841 mailed Feb. 25, 2008.

Audible Magic Office Action for U.S. Appl. No. 08/897,662 mailed Aug. 13, 1998.

Audible Magic Notice of Allowance for U.S. Appl. No. 08/897,662 mailed Jan. 29, 1999.

Audible Magic Office Action for U.S. Appl. No. 09/706,227 mailed May 5, 2004.

Audible Magic Office Action for U.S. Appl. No. 09/706,227 mailed Nov. 12, 2004.

Audible Magic Office Action for U.S. Appl. No. 09/706,227 mailed May 9, 2005.

Audible Magic Office Action for U.S. Appl. No. 09/706,227 mailed Nov. 1, 2005.

Audible Magic Office Action for U.S. Appl. No. 09/706,227 mailed Jun. 23, 2006.

Audible Magic Office Action for U.S. Appl. No. 09/706,227 mailed Nov. 7, 2006.

Audible Magic Office Action for U.S. Appl. No. 09/706,227 mailed Mar. 29, 2007.

Audible Magic Office Action for U.S. Appl. No. 09/706,227 mailed Sep. 17, 2007.

Audible Magic Office Action for U.S. Appl. No. 09/706,227 mailed May 29, 2008.

Audible Magic Office Action for U.S. Appl. No. 09/706,227 mailed Jan. 9, 2009.

Audible Magic Office Action for U.S. Appl. No. 10/192,783 mailed Dec. 13, 2004.

Audible Magic Notice of Allowance for U.S. Appl. No. 10/192,783 mailed Jun. 7, 2005.

Audible Magic Notice of Allowance for U.S. Appl. No. 11/239,543 mailed Apr. 23, 2008.

Audible Magic Notice of Allowance for U.S. Appl. No. 11/239,543 mailed Feb. 25, 2008.

Audible Magic Office Action for U.S. Appl. No. 09/910,680 mailed Nov. 17, 2004.

Audible Magic Office Action for U.S. Appl. No. 09/910,680 mailed May 16, 2005.

Audible Magic Office Action for U.S. Appl. No. 09/910,680 mailed Sep. 29, 2005.

Audible Magic Office Action for U.S. Appl. No. 09/910,680 mailed Jun. 23, 2006.

Audible Magic Office Action for U.S. Appl. No. 09/910,680 mailed Aug. 8, 2006.

Audible Magic Office Action for U.S. Appl. No. 09/910,680 mailed Jan. 25, 2007.

Audible Magic Office Action for U.S. Appl. No. 09/910,680 mailed Dec. 5, 2007.

Audible Magic Office Action for U.S. Appl. No. 09/999,763 mailed Apr. 6, 2005.

Audible Magic Office Action for U.S. Appl. No. 09/999,763 mailed Oct. 6, 2005.

Audible Magic Office Action for U.S. Appl. No. 09/999,763 mailed Apr. 7, 2006.

Audible Magic Office Action for U.S. Appl. No. 09/999,763 mailed Oct. 6, 2006.

Audible Magic Office Action for U.S. Appl. No. 09/999,763 mailed Mar. 7, 2007.

Audible Magic Office Action for U.S. Appl. No. 09/999,763 mailed Aug. 20, 2007.

Audible Magic Office Action for U.S. Appl. No. 09/999,763 mailed Jan. 7, 2008.

Audible Magic Office Action for U.S. Appl. No. 09/999,763 mailed Jun. 27, 2008.

Audible Magic Office Action for U.S. Appl. No. 09/999,763 mailed Dec. 22, 2008.

Audible Magic Office Action for U.S. Appl. No. 10/072,238 mailed May 3, 2005.

Audible Magic Office Action for U.S. Appl. No. 10/072,238 mailed Oct. 25, 2005.

Audible Magic Office Action for U.S. Appl. No. 10/072,238 mailed Apr. 25, 2006.

Audible Magic Office Action for U.S. Appl. No. 10/072,238 mailed Sep. 19, 2007.

Audible Magic Office Action for U.S. Appl. No. 10/072,238 mailed Apr. 7, 2008.

Audible Magic Office Action for U.S. Appl. No. 10/072,238 mailed Oct. 1, 2008.

Audible Magic Office Action for U.S. Appl. No. 11/116,710 mailed Dec. 13, 2004.

Audible Magic Office Action for U.S. Appl. No. 11/116,710 mailed Apr. 8, 2005.

Audible Magic Office Action for U.S. Appl. No. 11/116,710 mailed Oct. 7, 2005.

Audible Magic Office Action for U.S. Appl. No. 11/116,710 mailed Apr. 20, 2006.

Audible Magic Office Action for U.S. Appl. No. 11/116,710 mailed Jul. 31, 2006.

Audible Magic Office Action for U.S. Appl. No. 11/116,710 mailed Jan. 16, 2007.

Audible Magic Notice of Allowance for U.S. Appl. No. 11/116,710 mailed Nov. 19, 2007.

Audible Magic Notice of Allowance for U.S. Appl. No. 12/042,023 mailed Dec. 29, 2008.

Audible Magic Office Action for U.S. Appl. No. 11/048,307 mailed Aug. 22, 2007.

Audible Magic Office Action for U.S. Appl. No. 11/048,307 mailed May 16, 2008.

Audible Magic Office Action for U.S. Appl. No. 11/048,308 mailed Feb. 25, 2008.

Audible Magic Office Action for U.S. Appl. No. 11/048,308 mailed Mar. 5, 2009.

Audible Magic Office Action for U.S. Appl. No. 11/048,338 mailed Apr. 18, 2007.

Audible Magic Office Action for U.S. Appl. No. 11/048,338 mailed Oct. 11, 2007.
Audible Magic Office Action for U.S. Appl. No. 11/048,338 mailed Jan. 14, 2008.
Audible Magic Office Action for U.S. Appl. No. 11/048,338 mailed Jul. 9, 2008.
Audible Magic Office Action for U.S. Appl. No. 11/048,338 mailed Jan 7, 2009.
Audible Magic Office Action for U.S. Appl. No. 12/035,599 mailed Nov. 17, 2008.
Audible Magic Office Action for U.S. Appl. No. 12/035,609 mailed Dec. 29, 2008.
Audible Magic Office Action for U.S. Appl. No. 11/191,493 mailed Jul. 17, 2008.
Audible Magic Office Action for U.S. Appl. No. 11/191,493 mailed Jan. 9, 2009.
Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.
Business Wire, "IBM: IBM Announces New Descrambler Software; First to Offer Software to Work With Digital Video Chips," Jun. 25, 1997, 07:49.
Gasaway Laura, Close of Century Sees New Copyright Amendments, Mar. 2000, Information Outlook, 4, 3, 42.
Harris, Lesley Ellen, "To register or not," Mar. 2006, Information Outlook, 10, 3, 32(s).
Audible Magic Office Action for U.S. Appl. No. 11/239,543 mailed Apr. 23, 2008.
Audible Magic Notice of Allowance for U.S. Appl. No. 11/239,543 mailed Nov. 6, 2008.
Audible Magic Notice of Allowance for U.S. Appl. No. 11/239,543 mailed Feb. 25, 2009.
Audible Magic Office Action for U.S. Appl. No. 09/999,763 mailed Jul. 20, 2009.
Audible Magic Notice of Allowance for U.S. Appl. No. 12/042,023 mailed Jun. 25, 2009.
Audible Magic Notice of Allowance for U.S. Appl. No. 11/048,307 mailed May 29, 2009.
Audible Magic Notice of Allowance for U.S. Appl. No. 11/048,308 mailed Aug. 7, 2009.
Audible Magic Office Action for U.S. Appl. No. 11/048,338 mailed Jul. 6, 2009.
Audible Magic Office Action for U.S. Appl. No. 12/035,599 mailed May 29, 2009.
Audible Magic Office Action for U.S. Appl. No. 12/035,609 mailed Jun. 24, 2009.
Chen, et al., A Secure and Robust Digital Watermaking Technique by the Block Cipher RC6 and Secure Hash Algorithm, Department of Computer Science, National Tsing Hua University, 2001.
Pankanti, Sharath, "Verification Watermarks on Fingerprint Recognition and Retrieval", Part of IS&T/SPIE Conference on Security and Watermarking of Multimedia Contents, San Jose, CA, Jan. 1999, SPIE vol. 3657, pp. 66-78.
Audible Magic Office Action for U.S. Appl. No. 09/999,763 mailed Dec. 21, 2009.
Audible Magic Notice of Allowance for U.S. Appl. No. 12/042,023 mailed Mar. 8, 2010.
Audible Magic Office Action for U.S. Appl. No. 11/048,338 mailed Dec. 28, 2009.
Audible Magic Office Action for U.S. Appl. No. 12/035,599 mailed Nov. 24, 2009.
Audible Magic Notice of Allowance for U.S. Appl. No. 12/035,609 mailed Dec. 11, 2009.
Audible Magic Office Action for U.S. Appl. No. 11/191,493 mailed Apr. 28, 2009.
Audible Magic Office Action for U.S. Appl. No. 11/191,493 mailed Nov. 19, 2009.
Audible Magic Corporation, "Audio Identification Technology Provides the Cornerstone for Online Distribution," 2000, http://www.audiblemagic.com/documents/Technology_Summary.pdf.
European Patent Application No. 04706547.9 European Search Report Dated Feb. 25, 2010, 3 Pages.
European Patent Application No. 05778109.8 European Search Report Dated Sep. 10, 2010, 7 Pages.
Audible Magic Notice of Allowance for U.S. Appl. No. 12/251,404 mailed May 14, 2010.
Audible Magic Office Action for U.S. Appl. No. 12/482,313 mailed Feb. 4, 2011.
Audible Magic Office Action for U.S. Appl. No. 12/410,445 mailed Aug. 10, 2010.
Audible Magic Notice of Allowance for U.S. Appl. No. 12/410,445 mailed Oct. 20, 2010.
Audible Magic Office Action for U.S. Appl. No. 09/999,763 mailed Jun. 23, 2010.
Audible Magic Notice of Allowance for U.S. Appl. No. 09/999,763 mailed Sep. 16, 2010.
Audible Magic Office Action for U.S. Appl. No. 10/072,238 mailed Jan. 9, 2009.
Audible Magic Office Action for U.S. Appl. No. 10/072,238 mailed Mar. 31, 2009.
Audible Magic Office Action for U.S. Appl. No. 10/072,238 mailed Aug. 6, 2010.
Audible Magic Office Action for U.S. Appl. No. 12/488,504 mailed Nov. 10, 2010.
Audible Magic Office Action for U.S. Appl. No. 11/048,338 mailed Jun. 24, 2010.
Audible Magic Office Action for U.S. Appl. No. 12/035,599 mailed Jun. 9, 2010.
Audible Magic Notice of Allowance for U.S. Appl. No. 12/277,291 mailed May 12, 2010.
Audible Magic Office Action for U.S. Appl. No. 11/191,493 mailed Oct. 4, 2010.
Audible Magic Office Action for U.S. Appl. No. 11/829,662 mailed Oct. 8, 2010.
Audible Magic Office Action for U.S. Appl. No. 11/923,491 mailed Nov. 12, 2010.
Audible Magic Office Action for U.S. Appl. No. 12/405,174 mailed Mar. 2, 2011.

* cited by examiner

METHOD AND APPARATUS TO IDENTIFY A WORK RECEIVED BY A PROCESSING SYSTEM

BACKGROUND

1. Field of the Disclosure

The present disclosure relates to a system for determining an identification of a work from media content in data received by a processing system. More particularly, this invention relates to a system that generates a report of the identities of works received by a processing system.

2. The Prior Art

Data may be transferred between computer or other processing systems in a variety of ways. The data may be transferred by a first processing system writing the data to a media, such as a magnetic disk or compact disc, that may be read by a second processing system. The Internet may also be used to transfer data between computer systems. The data may be transferred via the Internet in a file or as a stream of data. The transferred data may include a work.

For purposes of the present discussion, a work is anything that is fixed in a tangible medium. Some examples of works include, but are not limited to, audio renderings, video renderings, images, video/audio renderings, and software. An example of an audio rendering is a song or other audio track. Examples of video renderings include animation or video sequence. Examples of an image include photographs and paintings. Examples of audio/video renderings include movies, television shows, and cartoons. Examples of software include word processing programs and video games.

Most works have a property right, such as a copyright associated with a work. Thus the owner of the property right is entitled to a royalty or other form of compensation for use of the work. For example, an owner of a song copyright, such as a songwriter, is entitled to a royalty for each copy of the recording produced.

Therefore, there is a need for a method to identify works that are present on computers systems and to generate reports of the works. The reports may be used to verify royalty payments or generate Arbitron®-like ratings by identifying how often works are being streamed, downloaded, or reproduced in another manner. The reports may be used by an organization to ensure that the organization obtain a proper license for a work prior to reproducing, perceiving, or otherwise communicating the work. Alternatively, the reports may be used to verify a bill of materials prior to the replication of a work. Furthermore, the report may be used to alert an agent of an owner of a work that a copy of the work is present on a processing system.

In order to identify works, most files or streams of data including the work include an identifier, such as a watermark, a meta-tag, a header, or other data structure that identifies the work in the data. Often a physical media, such as a Compact Disc (CD) or Digital Video Disc (DVD), that embodies the recording includes identifying marks or metadata stored on the media as well as the recording of the work. In order to avoid detection of a transfer of a work, many users may remove or change these identifiers in the file, a data stream or stored on a media such as a CD or DVD. Therefore, a processing system cannot rely on the presence or accuracy of these identifiers. Thus, a work may be reproduced by a processing system without the permission or knowledge of the owner of a property right in the work. For example, a user may remove a meta-tag from a file containing a song and transfer a file to a second processing system. Since the meta-tag no longer identifies the song in the file, the processing system may reproduce the song without proper identification of the work and/or the permission of an owner and may avoid paying royalty fees to the owner. Therefore, there is a need in the art for a method for identifying a work in a transferred file or data stream from the media content of the file. For purposes of the present discussion media content is the data in a transferred file or stream that is a representation of the work.

SUMMARY

The above and other problems are solved and an advance in the art is made by a method and an apparatus for identifying a work in transferred data in accordance with this invention. This invention is a system that is provided by executing instructions by processing systems in accordance with this invention. The instructions may be executed entirely by one processing system or may be executed by multiple processing systems connected in a server client relationship in accordance with this invention.

In accordance with the present invention, the identification of a work is determined and a report of a presence of the work is provided in the following manner. A processing system executes instructions that receive a fingerprint of a work. The fingerprint is generated from the media content of the work in the transferred data. The fingerprint may be an analytical representation of the works that is a measurement of the work, a collection of characteristics of the work, a synthesis of the work, and/or measurements of the work that forms a representation of the work. The processing system then determines an identity of the work from the fingerprint of the work. The processing system then generates a report that includes the identity of the work.

The fingerprint of the work may be received in a data transfer from a second processing system. In order to save time and transmission over head, the second processing unit may send fingerprints of more than one work at the same time. This occurs when the first and second processing systems are in a client server relationship. Alternatively, the fingerprint may be generated by the processing system that determines the identity. If the fingerprint of the work was received from a second processing system the report may be transmitted to the second processing unit. The second processing unit then stores the report for future use.

The first processing system may also store the report for future use. The first processing system may also transmit the report of the identification to a processing system of a owner of a property right in the work to notify the owner of a transfer of the work.

In one embodiment of this invention, the determination of the identity of a work from the fingerprint of the work is performed in the following manner. The processing system compares the fingerprint to each fingerprint of known works stored in a database of known works. When a match occurs between the fingerprint of the work and a fingerprint of a known work in the database, the identification of the work in the database is returned as the identity of the work.

If the fingerprint of the work does not match a fingerprint in the database of known works, the following process may be performed. The processing unit may compare the fingerprint to fingerprints stored in a database of unknown works. The processing unit then determines if the fingerprint matches any unknown works that have previously been received by the system. If the fingerprint of the work matches one of the fingerprints of unknown works, the processing unit may return a time of first detection of the work in the report and an indication that the work is unknown. If the fingerprint of the work does not match a fingerprint in the database of unknown work, the fingerprint may be stored in the database of unknown works along with a time of first detection and other information about the detection.

When the processing unit doing the identification is a server, a second processing unit or client may perform the following process to provide the fingerprint of the work to the server. The second processing system receives a data transfer including the work. The second processing unit then reads the media content of the work from the data being transferred. The fingerprint is then generated from the media content. The fingerprint is then transmitted to the server.

After the server generates the report including the identification of the work, the client receives the report from the server. The server then may store the report in a memory. The report then may be transmitted from the client or server to a processing system of the owner of a property right or other interested party, such as an agent, in the work. The report may also be provided in a printable format by the client or the server.

In order to generate the fingerprint from the media content of the work, the client may have to convert the format of the media content in the data transfer into a standard format. The conversion may include converting to the standard format from another format such as MP3, WMA, AVI, or Cabinet. The conversion may include separating audio and video data of a work.

BRIEF DESCRIPTION OF THE DRAWING FIGURES

Figure 2:
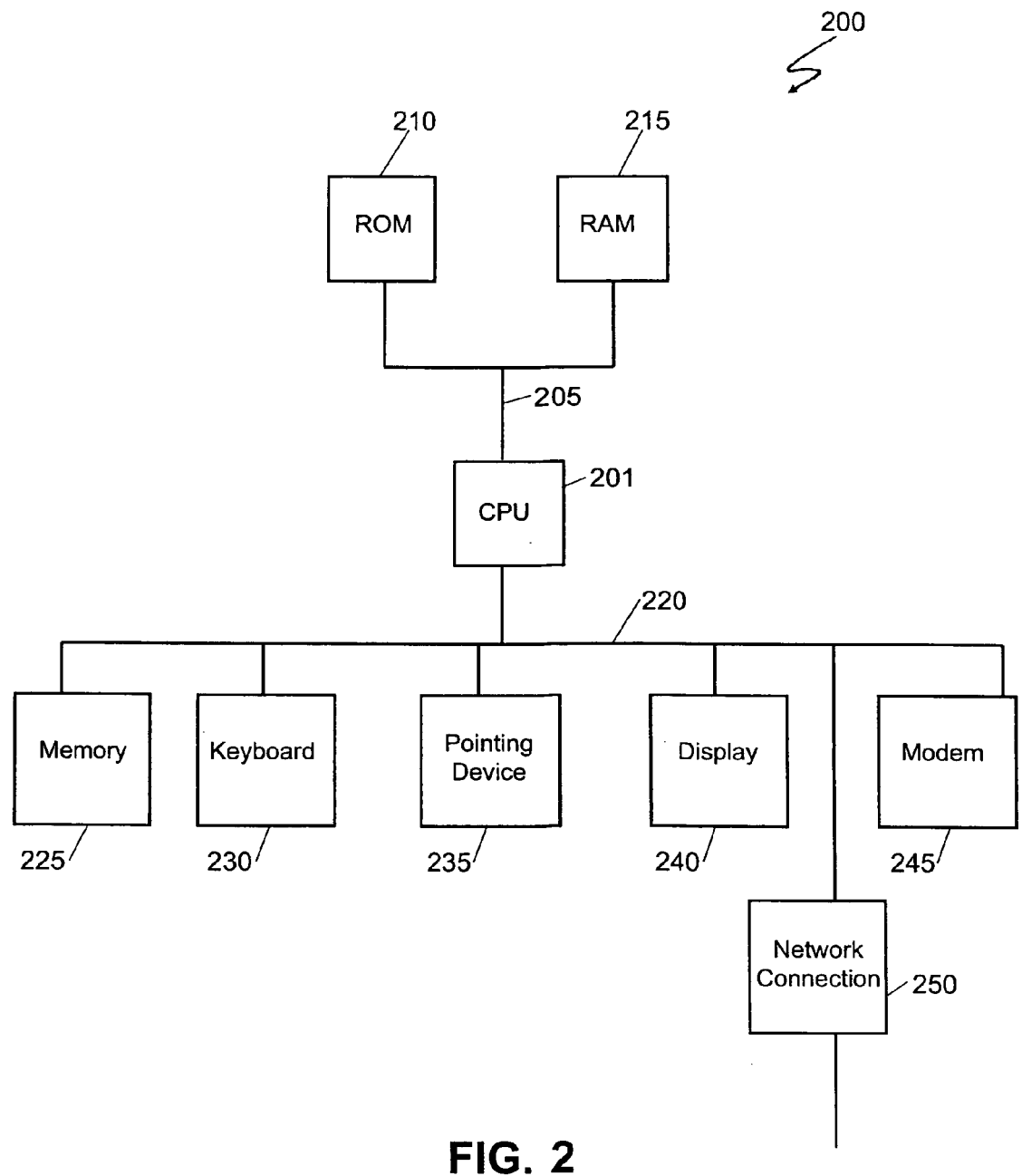
Figure 3:
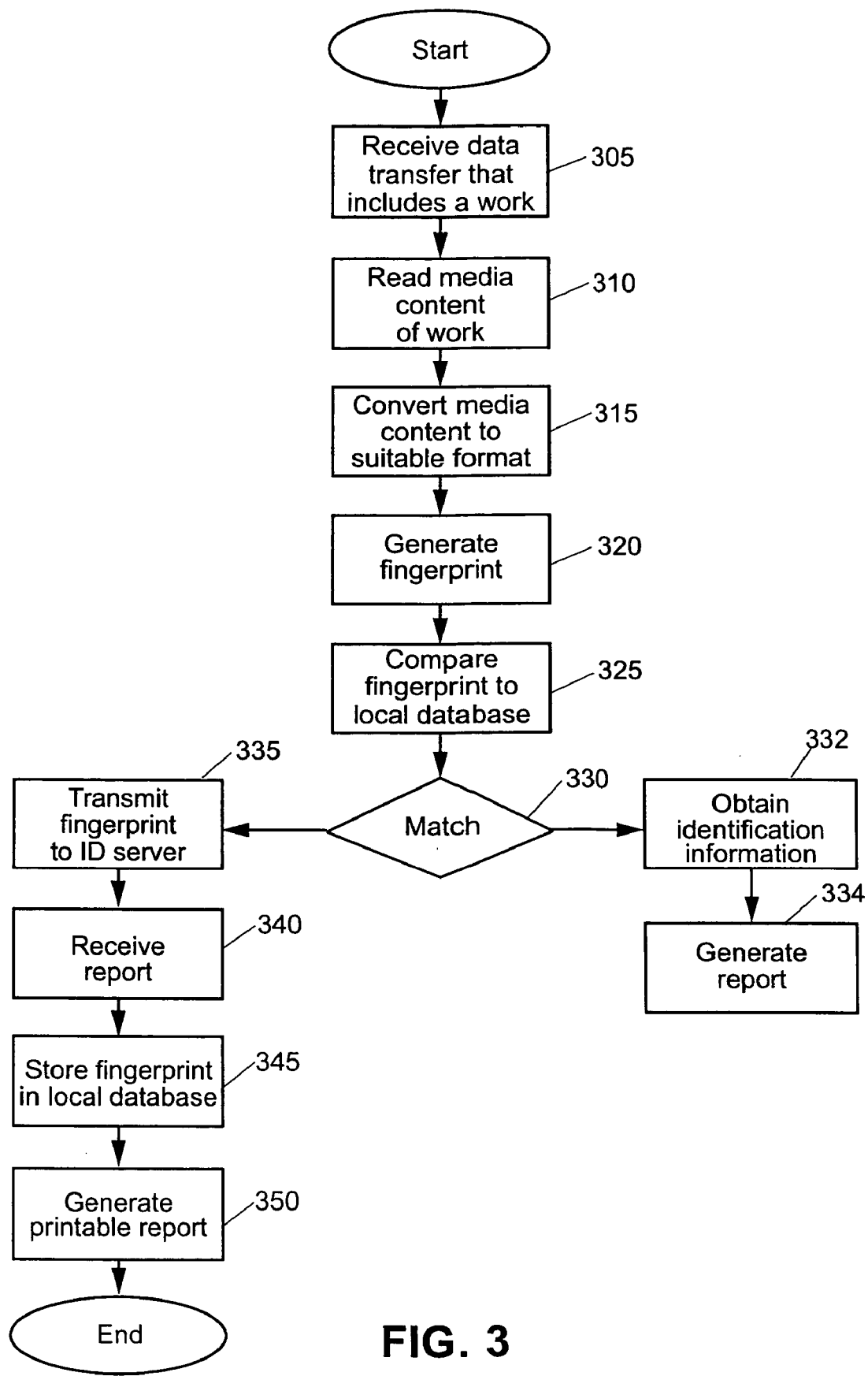
Figure 4:
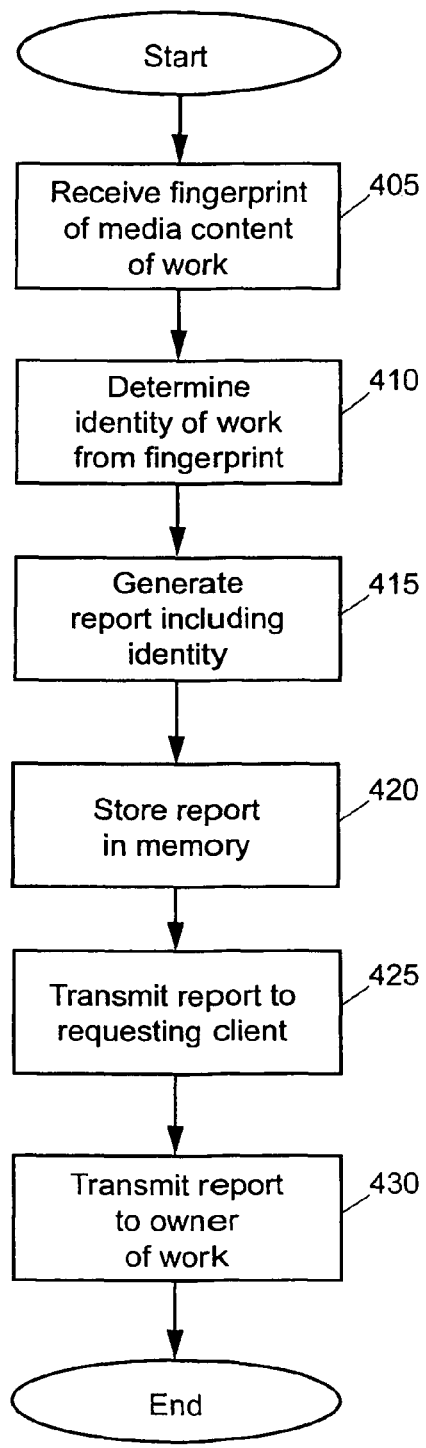
Figure 5:
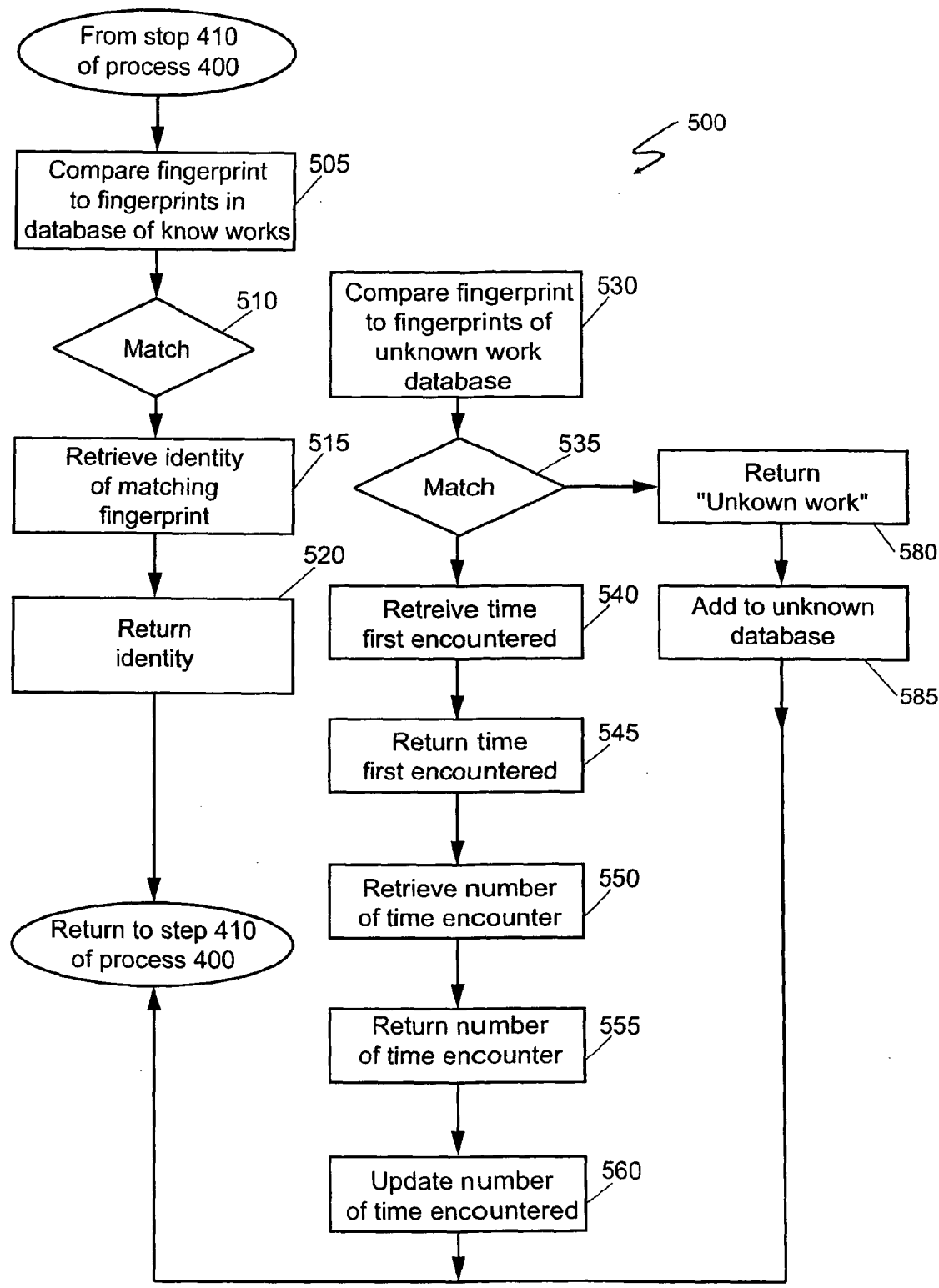
Figure 6:
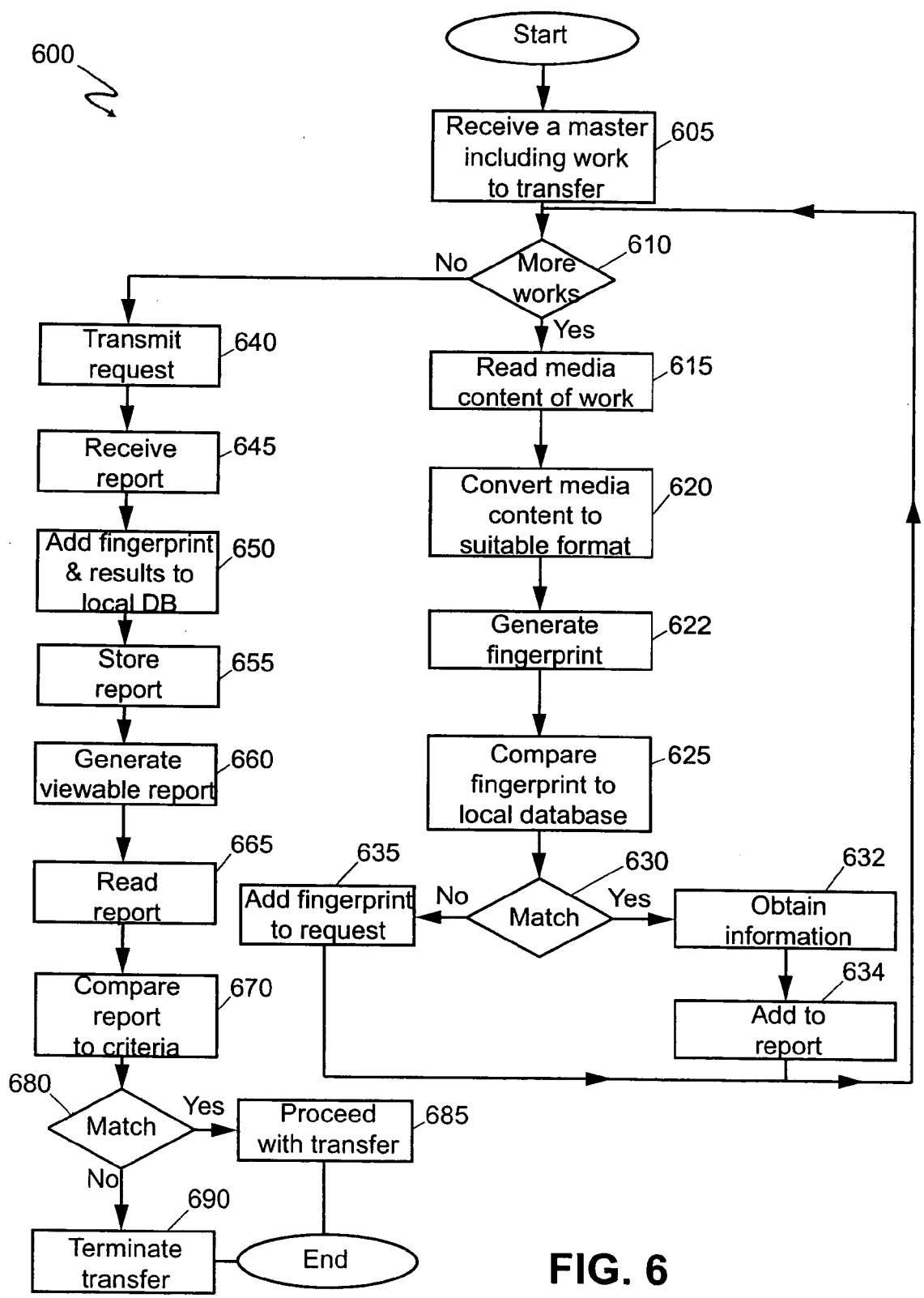

The above described and other features of this invention are described in the following Detailed Description and shown in the following drawings:

FIG. 1 illustrating a connection of processing systems in a network that perform processes for providing this invention;

FIG. 2 illustrating a block diagram of an example of a processing system that may perform any of the processes in accordance with this invention;

FIG. 3 illustrating a flow diagram of an exemplary process executed by a processing unit for receiving a data transfer and generating a fingerprint and receiving a report; and FIG. 4 illustrating a flow diagram of an exemplary process executed by processing unit to generate a report on the identity of a work;

FIG. 5 illustrating a flow diagram of a exemplary process executed by a processing unit to determine an identity of a work from the fingerprint; and FIG. 6 illustrating a flow diagram of an exemplary a process executed by a cline to provide a file transfer from a master copy.

DETAILED DESCRIPTION

Persons of ordinary skill in the art will realize that the following description is illustrative only and not in any way limiting. Other modifications and improvements will readily suggest themselves to such skilled persons having the benefit of this disclosure.

This disclosure relates to identifying a work in a data transfer from the media content of the work in the transferred data. Various disclosed aspects may be embodied in applications executed by computers or other processing systems. The applications are instructions stored on a media that is readable by a processing unit. The media may be any type of device that may store machine readable instructions and data.

FIG. 1 illustrates a system 100 having processing systems connected to network 105. For purposes of this discussion, a processing system is any system having a processor, microprocessor or any combination of processors and/or microprocessors to execute instructions stored in a memory to perform applications for handling data. In system 100, computers 150 and 152 are connected to network 105 via paths 151 and 153 to communicate with other processing systems in the network. Server 102 is connected to network 105 and provides various applications to other processing systems. Router 103 is connected to network 105 via path 163 and manages communication over network 105. Gateway server 104 is connected to network 105 via path 164 and connects to the servers via path 140 to provide Internet service, and other connections for use of network 105.

FIG. 2 illustrates a block diagram of an exemplary processing system 200 connected to network 105. Each of the processing systems such as personal computers 150, 152, server 102, router 103, and gateway computer 104 include the basic components of processing system 200. One skilled in the art will recognize that the various processing systems may include other components or other configurations depending on the particular function of the processing system in network 100. However, each of the processing systems may be able to execute the instructions for providing the following processes in accordance with this invention.

Processing system 200 includes a Central Processing Unit (CPU) 200. CPU 200 is a processor, microprocessor, or a group of a combination of processors and/or microprocessors. Each processor and/or microprocessor includes registers and other circuitry for executing instructions stored in a memory to provide applications for processing data. The CPU may also include firmware which is circuitry that stores instructions for various applications.

Memory bus 205 connects CPU 201 to memories for storing executable instructions and data for applications being executed by CPU 201. A non-volatile memory such as Read Only Memory (ROM) 210 may be connected to memory bus 205. ROM 210 stores instructions for drivers and configuration data for processing system 200. A volatile memory, such Random Access Memory (RAM) 215 is also connected to memory bus 205. RAM 215 stores data and instructions for applications being executed by CPU 201. One skilled in the art will recognize that other types of volatile memory SRAM and DRAM may also be connected. One skilled in the art will also recognize that memory caches may also be included in the memories and CPU modules.

Input/Output bus 220 connects CPU 201 to peripheral devices for transmission of data between CPU 201 and the peripheral devices. Examples of peripheral devices that may be connected to I/O bus 220 include memory 225, keyboard 230, pointing device 235, display 240, modem 245, and network connector 250. Those skilled in the art will recognize that these devices are shown for exemplary purposes and any of the devices may not be included in a processing system or other device may be included.

Memory 225 is a device for storing data and instructions for applications on a media. Memory 225 may include a disk drive for reading and writing data to a magnetic media, or an optical device for reading and/or writing data to in an optical format to an optical media such as a compact disc. Keyboard 230 is a device receiving alphanumeric data from a user. Pointing device 235 is a mouse, touch pad or other such device used to receive input for moving an icon or "pointer" across a display. Display 240 is a device that receives data from the processing unit and displays the data on a monitor. Modem 245 is a device that connects to a telephone and converts digital data to analog signals for transmission over the telephone line. Network device 250 is a device that connects system 200 to a network to send and receive data over the network. An example of a network device 250 is an "Ethernet Card" which includes circuitry for connecting to a network.

FIGS. 3-5 illustrate flow diagrams of the steps of processes executed by the processing systems to provide determination of an identification of a work in a data transfer. For purposes of this discussion, a data transfer may be a file read from a media, receiving a file in a file transfer via a network connection, or receiving a stream of data over a network connection.

FIG. 3 illustrates a process 300 executed by a client computer to receive a data transfer including a work. In FIG. 1, client computers may be personal computers 150 and 152 or a server that connects via the gateway server. One skilled in the art will recognize that process 300 may be modified to allow process 300 to be executed by the same processing system that performs the process of identifying the work by modifying process 300. In order to be performed by the same processing system, process 300 may be modified to pass data to the processes described below that are being executed by the same processing system.

Process 300 begins with the client computer receiving a data transfer that includes the media content of a work in step 305. As stated above, the data transfer may be reading a file stored on a media, receiving a file via file transfer over a network, or receiving a stream of data over a network. Furthermore, media content is the data that is a representation of a work and does not include meta-tags, headers or other descriptors that may be used to identify the work.

After, receiving the data transfer, the client reads the media content of the work from the received data in step 310. This may include separating headers, meta-tags, other descriptors, and data management overhead from the media content in the received data. Reading the media content in step 310 may also include extracting the media content from a physical media such as a CD or DVD. After the media content is read, an optional step of converting the media content to a format suitable for generating a fingerprint may be performed in step 315. If the media content is audio data, the format may be PCM samples. If the media content is compressed data or software, the suitable format may be an uncompressed form of the data. The conversion of step 315 is to put the data in the proper format to generate the fingerprint. The conversion of step 315 may also include separating video and audio data of a work. The conversion in step 315 may also include a rendering of MP3 data, a decoding of DDP data, a rendering of WMA real audio, a decoding of B64, or other typical encoding methods are known in the art. The conversion of step 315 may also include the decompression or separation of compressed binary data.

After, the media content of the work is in a suitable format the processing unit then generates the fingerprint of the media content in step 320. One skilled in the art will recognize that there are many algorithms that may be used to generate a fingerprint. Some of these known algorithms use the media content of the work exclusively to generate a fingerprint. Other algorithms may use the media content as well as physical descriptors, such as the descriptors separated in step 310, to generate the fingerprint. An example of a process for generating the fingerprint is the process described in U.S. Pat. No. 5,918,223 that may be used to generate a fingerprint of an audio work which is incorporated by reference into as if set forth in this application. An example of a process for generating a fingerprint of a software work is a Cyclical Redundancy Check that is well known in the art. One skilled in the art will recognize that the exact method for generating the fingerprint may be varied as long as the fingerprint generated is suitable for comparison against the fingerprints of known works.

If process 300 is being performed by a client processing unit, an optional step 325 may be performed in which the fingerprint is compared to fingerprints stored in a local known works database. This database may be populated with fingerprints and metadata of the most frequently copied works or with most previously transferred works or works of a particular interest. Typically, the local database may be significantly smaller than a known works database on a server. This local database may be used to speed up identification and reduce traffic to the server.

If optional step 325 is performed, the processing system determines whether the fingerprint of the work matches a fingerprint in the local database in step 330. If the fingerprint matches one of the fingerprints in the local database, the processing system obtains the identification information in step 332 and generates a report from the obtained information in step 334. The report includes the identification or title of the work and the time that the identification is performed. The report may also include the owner of the work, a list of attributes of the work, or any other information about the work stored in the database. The report is then stored in a memory connected to the processing system for future use in step 350.

If the fingerprint of the work does not match a fingerprint in the local database or after step 320 if optional step 325 is not performed, the processing system transmits the fingerprint of the work to an ID server, or second processing unit, in step 335. In order to reduce transmissions, save time or other reasons, the processing system may transmit the fingerprints of more than one works in a request. The transmission is typically in standard TCP/IP format over the Internet or a local network where there is connection of between the processing systems.

In step 340, the processing system then waits to receive a report back from the ID server. When the report is received, optional step 345 may be performed in which the fingerprint of the work and the identity of the work are stored in the local known works database for future comparisons. The report is then stored in step 350.

In step 355, the stored report may then be used to generate a printable report of all works received by the processing unit. This report may then be used as an anti-piracy report or an inventory report for confirmation of a bill of materials. Alternatively, an HTML version of the report may be generated. This allows the report to viewed using a commonly available web browser. In another alternative, the processing system may transmit the report to a processing system maintained by an owner of a property right in the work for billing or other uses. Alternatively, the report may be transmitted to processing systems of other interested parties, such as agents.

FIG. 6 illustrates a second exemplary embodiment a process 600 executed by a client processing system that copies multiple works to one or more storage media or in some other way distributes the works. Process 600 begins in step 605 by receiving a master copy of works to transfer. For purposes of this discussion, a master copy is collection of data that includes media content of one or more one or more works that is to be copied or in some other manner transmitted to another system. As stated above, the data transfer may be reading a file stored on a media, receiving a file via file transfer over a network, or receiving a stream of data over a network. Furthermore, media content is the data that is a representation of a work and does not include meta-tags, headers or other descriptors that may be used to identify the work.

In step 610, process 600 determines if there are any remaining works in the data of the master copy. If there is media content for at least one work remaining in the master copy, process 600 reads the media content of a work from the master copy in step 615. This may include separating headers, meta-tags, other descriptors, and data management overhead from the media content in the received data. Reading the media content of a work in step 615 may also include extracting the media content from a physical media such as a CD or DVD.

After the media content is read, an optional step of converting the media content to a format suitable for generating a fingerprint may be performed in step 620. If the media content is audio data, the format may be PCM samples. If the media content is compressed data or software, the suitable format may be an uncompressed form of the data. The conversion of step 620 is to put the data in the proper format to generate the fingerprint. The conversion of step 620 may also include separating video and audio data of a work. The conversion in step 620 may also include a rendering of MP3 data, a decoding of DDP data, a rendering of WMA real audio, a decoding of B64, or other typical decoding or decrypting methods are known in the art. The conversion of step 620 may also include the decompression or separation of compressed binary data.

After, the media content of the read work is in the suitable format the processing unit then generates the fingerprint of the media content in step 622. One skilled in the art will recognize that there are many algorithms that may be used to generate a fingerprint. Some of these known algorithms use the media content of the work exclusively to generate a fingerprint. Other algorithms may use the media content as well as physical descriptors, such as the descriptors separated in step 310, to generate the fingerprint. An example of a process for generating the fingerprint is the process described in U.S. Pat. No. 5,918,223 that may be used to generate a fingerprint of an audio work which is incorporated by reference into as if set forth in this application. An example of a process for generating a fingerprint of a software work is a Cyclical Redundancy Check that is well known in the art. One skilled in the art will recognize that the exact method for generating the fingerprint may be varied as long as the fingerprint generated is suitable for comparison against the fingerprints of known works.

An optional step 625 may be performed in which the fingerprint of the read work is compared to fingerprints stored in a local database of known works. This database may be populated with fingerprints and metadata of the most frequently copied works or with most previously transferred works or works of a particular interest. Typically, the local database may be significantly smaller than a known works database on a server. This local database may be used to speed up identification and reduce traffic to the server.

If optional step 625 is performed, the processing system determines whether the fingerprint of the read work matches a fingerprint in the local database in step 630. If the fingerprint matches one of the fingerprints in the local database, the processing system obtains the identification information of the matching fingerprint in step 632 in and ads the identification information to a report in step 634. The report includes the identification or title of the work and the time that the identification is performed. The report may also include the owner of the work, a list of attributes of the work, or any other information about the work stored in the database. Process 600 then returns to step 610 to perform another iteration.

If the fingerprint of the read work does not match a fingerprint in the local database in step 630 or after step 622 if optional step 625 is not performed, the processing system adds the fingerprint of the read work to request to be transmitted to an ID server, or second processing unit, in step 635. Process 600 then returns to step 610 to perform another iteration.

When process 600 determines that there are no remaining works to process, process 600 transmits the request that includes the fingerprints of the works to be identified in step 640. The request is transmitted to an ID sever or second processing system. The transmission is typically in standard TCP/IP format over the Internet or a local network where there is connection of between the processing systems.

In step 645, the processing system then waits to receive a report back from the ID server. When the report is received, optional step 645 may be performed in which the fingerprints and identities of the identified works are stored in the local known works database for future comparisons. The report is then stored in step 655. A viewable format of the report may then be generated in step 660. This may be a text file that is accessible by a word processing application or a file readable by a standard web browser.

Optional step 665 may also be performed in which data from the report is read. The read data is then compared to a criteria in step 670. This may include the owners or works, identities of work, or other data about works that are in the report. If the criteria is met by the data from the report, process 600 proceeds with the file transfer in step 675 and process 600 ends. Otherwise, process 600 terminates the transfer because the criteria was not met in step 680 and process 600 ends.

FIG. 4 illustrates a process 400 for generating a report about the identity of a work by an identification server. Process 400 may also be modified to be executed by the same processing unit that is executing process 300 depending on configuration of a system.

Process 400 begins in step 405 by receiving a request for a report of the identification of a work. The request includes a fingerprint of the work that is generated from the media content of the work. In order to minimize transmission and time, a request may include fingerprints of more than one work. In which case, the remaining steps of process 300 may be executed on each fingerprint in the request. Process 300 describes the generation of this fingerprint in the above description.

In step 410, process 400 determines the identity of the work based upon the received fingerprint. A description of a preferred method of determining the identity is described below and shown in FIG. 5.

In step 415, process 400 generates a report that includes the name of the work. The report may also include the time that the identification is requested, number of times the work is identified or any other relevant data that one skilled in the art determines necessary. The report is then stored in a memory that is connected to the processing system executing process 400 in step 420. The report may then be used to generate statistics and reports about the transfers of the work between processing systems.

In step 425, process 400 transmits the generated report to the processing system or client, requesting the identification. Optionally, process 400 may then transmit the report to a processing system maintained by an owner of a property right in the work or other interested party in step 430. The processing system may be determined from a record showing an IP or other address of the owner and may be sent as an E-mail or other type of transmission. The report may also be combined with other reports and sent to the owner as a batch of data periodically. The exact manner of the transmission is left to designer of the system knowing the requirements of various users of the system. After step 425 or step 430, process 400 ends.

Process 500 illustrates a preferred process for identifying a work from a fingerprint generated from the media content of the work that is performed in step 410 of FIG. 4. One skilled in the art will recognize that other method including statistical analysis of the fingerprint, may be interchangeable with process 500.

Process 500 begins in step 505 by comparing the fingerprint of the work to fingerprints of known works that are stored in a known works database. The known works database is a database that is maintained by the processing system that includes the fingerprints of all works that have an identity that is known. This database may be populated in many ways. For example, the database may be populated from the media content of works that are provided by owners of a property right in works. For example, a media company may provide the works including the identities and associated identification information. In a second example, a software publisher may provide the works including identities and associated identification information for software applications. In a third example, an image library, such as a stock photography company, may provide the works including identities and associated identification information for images. Fingerprints of the works are then generated and stored in a record of the work along with the identity of the work and other associated information. The exact populating and maintaining of the database is left to a designer of the system that will know the exact requirements needed by users of the system which will be obvious to anyone skilled in the art designing such a database.

In step 510, process 500 determines whether the received fingerprint matches one of the fingerprints in the database of known works. If the received fingerprint matches one of the fingerprints in the database of known works, process 500 retrieves the associated identifying information for each of the matching fingerprints from the database in step 515 and adds the identifying information to the results of the matching. The results are then returned in step 520. Process 500 then returns to step 410 of process 400 or step 330 of process 300.

If there is no match for the fingerprint in the database of known works, process 500 may return an unknown work message. Alternatively, process 500 may compare the fingerprint to fingerprints stored in a database of unknown works in step 530. The database of unknown works is a database maintained by the processing system that stores a record of all fingerprints encountered that did not match a fingerprint in the database of known works. The record for each fingerprint in this database may include a time the fingerprint is encountered, a number of times the fingerprint is encountered, a geographic or network location of the system requesting identification, other information that one skilled in the art may desire to track encounters of unidentified works.

Process 500 then determines whether the received fingerprint matched one of the fingerprints in the database of unknown works in step 535. If the received fingerprint matches one of the fingerprints in the unknown works database, process 500 retrieves the time of first encounter, number of encounters, and/or other metadata information in step 540. The time of first encounter, number of encounters and/or metadata information is then added to the result in step 545. The result is then returned in step 550. The number of encounters then may be incremented or updated in step 560 and then process 500 returns to step 410 of process 400 or step 330 of process 300.

If the received fingerprint does not match a fingerprint in the database of unknown works in step 535, an "unknown work" message is returned in step 580. Additionally, the received fingerprint may be added to the database of unknown works in step 585. The added record for the received fingerprint will include a time of the request as time of first encounter and any other information about the encounter that one skilled in the art may want to store. After step 585, process 500 ends.

While embodiments and applications have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A computer readable storage medium that provides instructions, which when executed by a first processing unit, cause the first processing unit to:
   receive a fingerprint of a work from a second processing unit, the fingerprint being generated from perceptual features of media content of said work without using metadata describing said work;
   determine that said fingerprint does not match any of a plurality of fingerprints in a database of known works coupled to the first processing unit;
   determine, by the first processing unit, that the fingerprint matches one of a plurality of fingerprints in a database of unknown works, the database of unknown works comprising record data for fingerprints encountered that did not match a fingerprint in the database of known works; and
   send, by the first processing unit, record data from the database of unknown works for the fingerprint to the second processing unit.

2. The computer readable storage medium of claim 1, wherein said instructions cause the first processing unit to receive said fingerprint of said work by:
   receiving a request from the second processing system, wherein the request includes a plurality of fingerprints wherein said fingerprint is a one of said plurality of fingerprints.

3. The computer readable storage medium of claim 2, wherein said instructions further cause the first processing unit to:
   send a message indicating that the fingerprint is an unknown work.

4. The computer readable storage medium of claim 1, wherein the record data in the database of unknown works comprises at least one of a time the fingerprint is encountered, a number of times the fingerprint is encountered, a geographic location of a system requesting an identification of the fingerprint, and a network location of a system requesting an identification of the fingerprint.

5. The computer readable storage medium of claim 1, wherein said instructions cause the first processing unit to send data by:
   providing a time of a first detection of said fingerprint.

6. The computer readable storage medium of claim 1, wherein said instructions cause the first processing unit to send data by:
   providing a location of a first detection of said fingerprint.

7. The computer readable storage medium of claim 1, wherein said instructions further cause the first processing unit to:
   storing said fingerprint in said database of unknown works.

8. A method to determine an identification of replicated media content, implemented by a first processing system the method, comprising:
- receiving a fingerprint of a work from a second processing system, the fingerprint being generated from perceptual features of media content of said work without using metadata describing said work;
- determining that said fingerprint does not match any of a plurality of fingerprints in a database of known works maintained by the first processing system;
- determining that the fingerprint matches one of a plurality of fingerprints in a database of unknown works, the database of unknown works comprising record data for fingerprints encountered that did not match a fingerprint in the database of known works; and
- sending record data from the database of unknown works for the fingerprint to the second processing system.

9. The method of claim 8 wherein receiving said fingerprint of said work further comprises:
- receiving a request from the second processing system by said first processing system wherein said request includes a plurality of fingerprints wherein said fingerprint is a one of said plurality of fingerprints.

10. The method of claim 9, wherein sending data from the database of unknown works comprises:
- send a message indicating that the fingerprint is an unknown work.

11. The method of claim 8, wherein the data in the database of unknown works comprises at least one of a time the fingerprint is encountered, a number of times the fingerprint is encountered, a geographic location of a system requesting an identification of the fingerprint, and a network location of a system requesting an identification of the fingerprint.

12. The method of claim 8 wherein sending data comprises:
- providing a time of a first detection of said fingerprint.

13. The method of claim 8 wherein sending data comprises:
- providing a location of a first detection of said fingerprint.

14. The method of claim 8, further comprising:
- storing said fingerprint in said database of unknown works maintained by said first processing system.

15. A system comprising:
- a processing device; and
- a memory coupled to the processing device to provide instructions, which when executed by the processing device, cause the processing device to
- determine that a fingerprint of a work received from a second system does not match any of a plurality of fingerprints in a database of known works maintained by the system, the fingerprint being generated from perceptual features of media content of said work without using metadata describing said work;
- determine that the fingerprint matches one of a plurality fingerprints in a database of unknown works, the database of unknown works comprising data for fingerprints encountered that did not match a fingerprint in the database of known works and
- send record data from the database of unknown works for the fingerprint to the second processing device.

16. The system of claim 15 wherein the processing device is further to:
- store said fingerprint in said database of unknown works.

17. The system of claim 15 wherein the data in the database of unknown works comprises at least one of a time the fingerprint is encountered, a number of times the fingerprint is encountered, a geographic location of a system requesting an identification of the fingerprint, and a network location of a system requesting an identification of the fingerprint.

18. The system of claim 15 wherein the first processing device is to send data to the second processing device by:
- providing a time of a first detection of said fingerprint.

19. The system of claim 15 wherein the first processing device is to send data to the second processing device by:
- providing a location of a first detection of said fingerprint.

* * * * *